United States Patent [19]

Mizumoto et al.

[11] Patent Number: 4,995,923

[45] Date of Patent: Feb. 26, 1991

[54] THIN FILM OF AMORPHOUS ALLOY

[75] Inventors: Kunihiko Mizumoto; Koichi Haruta; Hirokazu Kajiura, all of Ichihara, Japan

[73] Assignee: Mitsui Petrochemical Industries, Ltd., Tokyo, Japan

[21] Appl. No.: 258,721

[22] Filed: Oct. 17, 1988

[51] Int. Cl.[5] .............................................. H01F 1/153
[52] U.S. Cl. .................................... 148/304; 148/403; 420/463; 420/466; 428/928
[58] Field of Search .............................. 148/304, 403; 420/463–468; 428/611, 928

[56] References Cited

U.S. PATENT DOCUMENTS

| | | | |
|---|---|---|---|
| 4,236,946 | 12/1980 | Aboaf et al. | 148/304 |
| 4,439,253 | 3/1984 | Ramanan | 148/403 |
| 4,654,276 | 3/1987 | Ahlert et al. | 428/928 |
| 4,789,598 | 12/1988 | Howard et al. | 428/928 |
| 4,814,027 | 3/1989 | Masumoto et al. | 420/466 |
| 4,885,134 | 12/1989 | Hatwar | 428/928 |

FOREIGN PATENT DOCUMENTS

| | | | |
|---|---|---|---|
| 192161 | 8/1986 | European Pat. Off. | 148/304 |
| 0263380 | 4/1988 | European Pat. Off. | |
| 0316615 | 5/1989 | European Pat. Off. | |
| 3203918A1 | 9/1982 | Fed. Rep. of Germany. | |
| 117749 | 6/1986 | Japan | 148/304 |

OTHER PUBLICATIONS

Patent Abstracts of Japan, vol. 10, No. 127, May 13, 1986, Publication No. 60-253040, (Kokai).

*Primary Examiner*—Theodore Morris
*Assistant Examiner*—George Wyszomierski
*Attorney, Agent, or Firm*—Sherman and Shalloway

[57] ABSTRACT

A thin film of an amorphous alloy comprising (i) at least one element selected from Fe and Co, (ii) at least one element selected from Pt and Pd and (iii) at least one element selected from (a) 3d transition elements other than Fe and Co, (b) 4d transition elements other than Pd, (c) 5d transition elements other than Pt, (d) light rare earth elements, (e) Group III B elements, (f) Group IV B elements, (g) Group V B elements, and (h) Group VI B elements, and the film having an easy axis of magnetization perpendicular to the film face. The thin film has excellent magnetooptical characteristics including increased coercive force and large Kerr-rotation angle and Faraday-rotation angle, and is excellent in resistance to oxidation and in consequence the coercive force and Kerr-angle of the film do not substantially change with time. The film has a high reflectance as well.

21 Claims, No Drawings

THIN FILM OF AMORPHOUS ALLOY

FIELD OF THE INVENTION

The present invention relates to a thin film of an amorphous alloy having excellent resistance to oxidation. More particularly, it relates to a thin film of an amorphous alloy which has an easy axis of magnetization perpendicular to the film face and which is excellent in resistance to oxidation.

BACKGROUND OF THE INVENTION

It is known that thin films of an amorphous alloy j comprising at least one transition metal such as iron and cobalt and at least one rare earth element such as terbium (Tb) and gadolinium (Gb) have an easy axis of magnetization perpendicular to the film face and are capable of forming a small inverse magnetic domain with magnetization anti-parallel to the magnetization of the film. By corresponding the existence or non-existence of this inverse magnetic domain to "1" or "37 0", it becomes possible to record a digital signal on the amorphous alloy thin film as mentioned above.

As thin films of an amorphous alloy comprising at least one transition metal and at least one rare earth element which can be used as magnetooptical recording media, thin films of amorphous alloys of Tb-Fe series containing from 15 to 30 atom % of Tb, are disclosed, for example, in Japanese Patent Publication 57-20691. There are also known magnetooptical recording media comprising a thin film of an amorphous alloy of Tb-Fe series to which a third metal has been added. Magnetooptical recording media of Tb-Co series and Tb-Fe-Co series are known as well.

Though the magnetooptical recording media comprising a thin film of an amorphous alloy as exemplified above have excellent recording and reproducing characteristics, they still involve such a serious problem from a practical standpoint that the amorphous alloy thin film is subject to oxidation in the course of ordinary use and the characteristics come to change with time.

The mechanism of oxidative deterioration of amorphous alloy thin films comprising transition metals and rare earth elements as mentioned above, is discussed, for example, in Journal of the Society of Applied Magnetism of Japan, Vol. 9, No. 2, pp 93–96, and this paper reports that this mechanism of oxidative deterioration may be classified into three types as noted below.

(a) Pit corrosion

By pit corrosion is meant the occurrence of pinholes in the amorphous alloy film. This corrosion proceeds mainly under the circumstances of high humidity, and it markedly proceeds, for example, in films of Tb-Fe and Tb-Co series.

(b) Surface oxidation

A surface oxide layer is formed on the surface of the amorphous alloy film, whereby the Kerr-rotation angle $\theta k$ of the film changes with time and eventually comes to decrease.

(c) Selective oxidation of rare earth element

Rare earth elements present in magnetooptical recording films are selectively oxidized, whereby coercive force Hc of the films comes to largely change with time.

Various attempts have heretofore been made to inhibit such oxidative deterioration of amorphous alloy thin films as mentioned above. For instance, there is proposed a procedure in which a thin film of an amorphous alloy is to have a three-layer structure wherein the film is sandwiched between anti-oxidizing protective layers such as those of $Si_3N_4$, SiO, $SiO_2$, and AlN. The anti-oxidizing protective layers as proposed above, however, involved such problems that they are relatively expensive and, at the same, time, they require much time and labor to be formed on amorphous alloy thin films, and that a sufficient inhibition of oxidative deterioration of the films is not always expected even when such anti-oxidizing protective layers are formed on the films.

Furthermore, various attempts are being made to improve resistance to oxidation of amorphous alloy thin films by incorporating a third component metal into the films such as Tb-Fe and Tb-Co series.

For instance, Journal of the Society of Applied Magnetism of Japan cited above discloses an attempt to improve resistance to oxidation of amorphous alloy thin film of Tb-Fe or Tb-Co series by incorporation into the films of such third component metal as Co, Ni, Pt, Al, Cr and Ti in an amount of up to 3.5 atom %. In connection with the attempt, the said Journal reports that the incorporation of small amounts of Co, Ni and Pt into Tb-Fe or Tb-Co is effective in inhibiting the surface oxidation and hole corrosion of the resulting film but has not effect on inhibition of the selective oxidation of Tb contained as a rare earth element in this film. This disclosure means that when small amounts of Co, Ni and Pt are added to Tb-Fe or Tb-Co, Tb present in the resulting film is selectively oxidized, and coercive force Hc of the film largely changes. Thus, even when small amounts up to 3.5 atom % of Co, Ni and Pt are added to Tb-Fe or Tb-Co, no sufficient improvement in resistance to oxidation of the resulting film is made.

With the view of improving resistance to oxidation of amorphous alloy thin films, a teaching on the amorphous alloy thin films which are obtained by adding Pt, Al, Cr and/or Ti in an amount up to 10 atom % to Tb-Fe or Tb-Fe-Co is disclosed on page 209 of the Proceedings of The Nineth Conference the Society Applied Magnetism of Japan (Nov. 1985). Even when Pt, Al, Cr and /or Ti in an amount up to 10 atom % are added to Tb-Fe or Tb-Fe-Co, however, inhibition of selective oxidation of Tb present in the resulting films is not sufficient, though the surface oxidation and hole corrosion can be inhibited to a fairly effective extent. Thus, there was still left such a problem that coercive force Hc of the resultant films will largely change with time, and eventually the coercive force Hc will largely decrease.

The prior art references discussed above do not disclose a thin film of an amorphous alloy as disclosed herein.

Journal of Magnetism & Magnetic Materials, 41, (1984), pp 128–130 and pp 125–127 discloses amorphous alloys of Fe-B series having added thereto up to about 3 atom % of Co, Cr or Pt. The amorphous alloys are formed into ribbons having a thickness of from 25 to 30 $\mu$m, and their magnetic strains are studied. None of the disclosed alloys has, however, a sufficiently improved resistance to oxidation.

Furthermore, amorphous alloy ribbons obtained by a melt spinning or splat cooling method as described in this paper are magnetizable within the ribbon plane rather than perpendicularly to the ribbon plane. No consideration is given as to possibility of vertical magnetization of the ribbons.

Japanese Patent Laid-Open Publication 58-7806 discloses polycrystalline thin films having a composition of PtCo in which Pt is contained in an amount of 10–30 atom %.

However, the polycrystalline thin films having this composition of PtCo involves such problems that the polycrystalline thin films as formed require heat treatment such as annealing because that are polycrystalline, that grain boundaries sometimes appear as noise signals, and that the polycrystalline thin films are high in Curie point.

OBJECT OF THE INVENTION

The invention is to solve the above-discussed problems associated with the prior art and an object of the invention is to provide a thin film of an amorphous alloy which has excellent magnetooptical characteristics including increased coercive force and large Kerr-and Faraday-rotation angles, and which is excellent in resistance to oxidation and in consequence the coercive force and Kerr-angle of the film do not substantially change with time, and which has a high reflectance.

SUMMARY OF THE INVENTION

A thin film of an amorphous alloy according to the invention comprises:
(i) at least one element selected from Fe and Co,
(ii) at least one element selected from Pt and Pd, and
(iii) at least one element selected from
  (a) 3d transition elements other than Fe and Co,
  (b) 4d transition elements other than Pd,
  (c) 5d transition elements other than Pt,
  (d) light rare earth elements, (i.e. La, Ce, Pr, Nd, Pm, Sm and Eu)
  (e) Group III B elements,
  (f) Group IV B elements,
  (g) Group V B elements, and
  (h) Group VI B elements,
and has an easy axis of magnetization perpendicular to the film face.

The thin film of an amorphous alloy according to the invention has excellent magnetooptical characteristics including increase coercive force and large Kerr-rotation angle and Faraday-rotation angle. Further, it is excellent in resistance to oxidation, and in consequence, the coercive force and Kerr-angle of the film do not substantially change with time. In addition, it has a high reflectance, and in turn excellent reproducing characteristics such as increased S/N ratio.

DETAILED DESCRIPTION OF THE INVENTION

The thin film of an amorphous alloy according to the invention will now be described in detail.

The thin film of an amorphous alloy according to the invention comprises (i) at least one element selected from Fe and Co, (ii) at least one element selected from Pt and Pd and (iii) at least one element selected form the group (a), (b), (c), (d), (e), (f), (g) and (h) as noted below and has and easy axis of magnetization perpendicular to the film face.

(i) at least one element selected from Fe and Co

Fe and/or Co is contained in the amorphous alloy thin film according to the invention preferably in an amount of from 2 to 95 atom %. In cases where a half or more (at least 50 atom %) of the element or elements (iii) contained in the film comprises a light rare earth element or elements, it is preferable that the film contains Fe and/or Co in an amount of from 5 to 84 atom %, in particular from 10 75 atom %. In cases where a half or more (at least 50 atom %) of the element or elements (iii) contained in the film comprises an element or elements other than light rare earth elements, Fe and/or Co is contained in the film in an amount of preferably from 5 to 94 atom %, more preferably from 10 to 89 atom %, and most preferably from 10 to 80 atom %.

(ii) at least one element selected from Pt and Pd

It is sufficient that the film contains more than 0 atom % of Pt and/or Pd. Preferably the film contains up to 94 atom % of Pt and/or Pd. In cases where a half or more (at least 50 atom %) of the element or elements (iii) contained in the film comprises a light rare earth element or elements, it is preferable that the film contains Pt and/or Pd in an amount of from 5 to 94 atom %, in particular from 10 to 80 atom %. In cases where a half or more (at least 50 atom %) of the element or elements (iii) contained in the film comprises an element or elements other than light rare earth elements, Pt and/or Pd is contained int he film in an amount of preferably for up to 90 atom %, more preferably up to 80 atom %, and most preferably from 10 to 80 atom %.

The presence of Pt and/or Pd in the film brings about the following advantages.

(1) In cases where films contain light rare earth element(s).

It is possible to make films vertically magnetizable without using any heavy rare earth elements, which have heretofore been necessary to prepare vertically magnetizable films. The films are resistant to pit corrosion and surface oxidation, and the Kerr-angle does not change with time. Especially, in cases wherein the films contain at least 5 atom % of Pt and/or Pd, selective oxidation of light rare earth element present in the films is inhibited whereby the coercive force does not change with time and the reflectance on the film face is enhanced.

(2) In cases where films do not contain light rare earth element(s).

Amorphous, vertically magnetizable films which are resistant to pit corrosion and surface oxidation, and whose Kerr-angle does not change with time can be provided. Especially, in cases where the films contain at least 5 atom % of Pt and/or Pd, the reflectance is enhanced.

(iii) at least one element selected from the groups (a), through (h).

The thin film of an amorphous alloy according to the invention comprises, in addition to (i) and (ii) above, at least one element selected from the group (a) through (h) noted below.

(a) 3d transition elements other than Fe and Co
  Examples of 3d transition elements other than Fe and Co include Sc, Ti, V, Cr, Mn, Ni, Cu and Zn. Of these, Ti, Ni, Cu and Zn are preferred.

(b) 4d transition elements other than Pd
  Examples of 4d transition elements other than Pd include Y, Zr, Nb, Mo, Tc, Ru, Rh, Ag and Cd. Of these, Zr and Nb are preferred.

(c) 5d transition elements other than Pt
  Examples of 5d transition elements other than Pt include Hf, Ta, W, Re, Os, Ir, Au and Hg. Of these, Ta is preferred.

(d) Light rare earth elements (i.e. La, Ce, Pr, Nd, Pm, Sm and Eu)
  Of these, Nd is preferred.

(e) Group III B elements

Examples of Group III B elements include B, Al, Ga, In and Tl. Of these, B, Al and Ga are preferred.

(f) Group IV B elements

Examples of Group IV B elements include C, Si, Ge, Sn and Pb. Of these Si, Sn, Pb and Ge are preferred.

(g) Group V B elements

Examples of Group V B elements include N, P, As, Sb and Bi. Of these, Sb is preferred.

(h) Group VI B elements

Examples of Group VI B elements include S, Se, Te, and Po. Of these Te is preferred.

At least one element selected from the groups (a) through (h) is contained in the amorphous alloy thin film according to the invention preferably in an amount of from 2 to 95 atom %. In cases where a half or more (at least 50 atom %) of the element or elements (iii) contained in the film comprises a light rare earth element or elements, it is preferable that the film contains the element or elements (iii) in an amount of from 1 to 80 atom %, more preferably from 10 to 70 atom %, and in particular from 10 to 50 atom %. In cases where a half or more (at least 50 atom %) of the element or elements (iii) contained in the film comprises an element or element other than light rare earth elements, the element or elements (iii) are contained in the film in an amount of preferably from 5 to 94 atom %, more preferably form 10 to 89 atom %, and most preferably from 10 to 80 atom %.

The thin film having the composition mentioned above is an amorphous alloy with an easy axis of magnetization perpendicular to the film face as confirmed by broad angle X-ray diffractmetory and may exhibit a Kerr-hysterisis loop of a favorable square-shaped form.

By the expression 'the film exhibits a Kerr-hysterisis loop of a favorable square-shaped form' is meant that the ratio $\theta k_2/\theta k_1$ is at least 0.8 wherein $\theta k_1$ is a Kerr-rotation angle at saturation magnetization where the external magnetic field is maximum and $\theta k_2$ is a Kerr-rotation angle at remanent magnetization where the external magnetic field is zero.

As described above, the films containing at least 15 atom % of Pt and/or Pd have an improved reflectance R when compared with films containing no Pt or Pd. When amorphous alloy thin films are utilized in magnetooptical recording, it is not necessary to consider medium noise owing to grain boundaries because of the amorphous nature of the medium. Shot noise of the optical detector employed must be considered. In this case it will be appreciated that since S/N is proportional to $R\theta k$, it is sufficient to enlarge at least one of R and $\theta k$ in order to enhance the S/N. Accordingly, the fact that the amorphous alloy films may have an increased reflectance R is advantageous, since it leads to an enhanced S/N in magnetooptical recording.

In the present invention, it is also possible to improve the Curie point, compensation temperature, coercive force Hc or Kerr-rotation angle $\theta k$ of the film, or to reduce the cost of production by incorporation various elements into the film. These elements for the purposes intended may be used, for example, in such a proportion that they substitute for less than 50 atom % of the element or elements (iii). Examples of such other elements are heavy rare earth elements, including, for example, Gd, Tb, Dy, Ho, Er, Tm, Yb and Lu. When these heavy rare earth elements are conjointly used, at least 5 atom % of Pt and/or Pd should preferably be used to overcome the problem of selective oxidation.

A process for preparing the amorphous alloy thin films of the present invention is illustrated hereinafter.

The amorphous alloy thin films according to the invention may be prepared by depositing a thin film having a predetermined composition on a substrate, wherein the substrate is maintained at about room temperature, and a composite target with chips of elements constituting the desired film in the predetermined proportions thereon or an alloy target having the predetermined composition is deposited by the sputtering method or electron beam evaporation method on said substrate (this substrate may be fixed, or may rotate on its axis or may rotate on its axis while revolving).

Thus, the amorphous alloy thin films according to the invention may be formed at room temperature, and the films so formed are not always in need of such heat treatment as annealing that is usually required for allowing the films to have an easy axis of magnetization perpendicular in the film.

If necessary, in this connection, the amorphous alloy thin film according to the invention can also be formed on a substrate while heating the substrate to 50°-600° C., or while cooling the substrate to −50° C.

At the time of sputtering, moreover, biasing a substrate is also possible so that the substrate comes to have a negative potential. By doing so, ions of an inert gas such as argon accelerated in the electric field will hit not only target substances but also the film being formed and consequently a vertically magnetizable film having excellent characteristics may be obtained.

The thickness of the amorphous alloy thin films according to the invention can be from 20 to 50000 Å, preferably from 100 to 5000 Å.

Since the amorphous alloy thin films according to the invention have an easy axis of magnetization perpendicular to the film face, they are utilizable in such various fields as magnetic recording materials including vertical magnetic recording films, magnetic bubble memories and magnetooptical recording films, and in optical modulaters which utilize magnetooptical effects.

In the field of vertical magnetic recording, the amorphous alloy thin films according to the invention find application as recording films of vertical flexible discs and rigid magnetic discs. In the field of magnetooptical recording, magnetooptical discs, magnetooptical cards and magnetooptical tapes for recording and reproducing information signals, or stationary or moving images utilizing the Kerr-rotation angle or Faraday-rotation angle of the films. Further, they may be used in optical modulators which control the Kerr-or Faraday-rotation angle of an installed amorphous alloy thin film by controlling the external magnetic field, and operate a photo cell by changing a photo quantity of a relection or transmission light.

The case where the amorphous alloy thin films according to the invention are as recording films of magnetooptical discs is illustrated hereinafter.

The films according to the invention are vertically magnetizable films with an easy axis of magnetization perpendicular to the film and, preferred films have the Kerr hysterisis loop of a square-shaped form, that is $\theta k$ under the circumstances where no external magnetic field exists is practically the same as $\theta k$ at saturation magnetization where the external magnetic field is maximum, and also the coercive force Hc is large, and hence they are suitable as magnetooptical recording films. Furthermore, that $\theta k$ is favorable means that $\theta f$ is also favorable, and accordingly the amorphous alloy thin films according to the invention are utilizable in both of Kerr-effect utilization system and Faraday effect utilization system.

Furthermore, since the films according to the invention are excellent in resistance to oxidation, they are not always in need of use of such protective films for prevention of oxidation as used in the conventional films comprising heavy rare earth elements and 3d transition metal alloys such as Tb-Fe. Tb-Fe-CO.

Moreover, it is not always necessary to use antioxidizing materials in a substrate adjacent to the recording film or other functional films (e.g. enhancing film and reflection film), or adhesive layers for lamination purposes.

Further, even when enhancing film and/or reflection film is formed on the amorphous alloy films according to the invention, the films can be formed by the wet film forming method such as the spin or spray coating process that could not be employed in the conventional magnetooptical recording films, in addition to the dry film forming method such as vacuum evaporation or sputtering.

Accordingly, the structure of magnetooptical discs bearing the amorphous alloy films according to the invention recording films thereon may include such structure as mentioned below.

(i) Substrate/recording film,
(ii) Substrate/enhancing film/recording film,
(iii) Substrate/recording film/reflection film,
(iv) Substrate/enhancing film/recording film/reflection film, and
(v) Substrate/enhancing film/recording film/enhancing film/reflection film.

The magnetooptical discs having such structures illustrated above may also have on the outermost layer of the recording film side a protective film or protective label for imparting scratch resistance or resistance to oxidation to said outermost layer.

The enhancing films may be of organic or inorganic materials so long as they have a refractive index larger than that of a substrate.

Examples of suitable materials for enhancing films include, for example, oxides such as $TiO_2$, TiO, ZnO, ITO (indium tin oxide), $ZrO_2$, $Ta_2O_5$, $Nb_2O_5$, $CeO_2$, $SnO_2$ and $TeO_2$; nitrides such as $Si_3N_4$, AlN and BN; sulfides such as ZnS and CdS; and ZnSe, SiC and Si. Further, transparent materials having Faraday effect such as ferrites, typically cobalt ferrite, and garnet, may also be used as a material for materials for enhancing films.

As the substrate, there may be used inorganic material such as glass, aluminum, etc. and organic material such as polymethyl methacrylate, polycarbonate, polymer alloy of polycarbonate and polystyrene, amorphous polyolefins as disclosed in U.S. Pat. No. 4,614,778, poly-4-methyl-1-pentene, epoxy resin, polyether sulfone, polysulfone, polyether imide, etc.

Further, the structure of the magnetooptical discs is not limited only to the structure (i)-(v) mentioned above, and the discs may be provided with a subbing layer, anti-oxidizing film or highly permeable soft magnetic film, if necessary, and the discs may be used either singly or in the form of a laminated disc obtained by bonding two discs each other.

EFFECT OF THE INVENTION

A thin film of an amorphous alloy according to the invention comprising (i) at least one element selected from Fe and Co, (ii) at least one element selected from Pt and Pd and (iii) at least one element selected form the groups (a) to (h) as mentioned above, and having an easy axis of magnetization perpendicular to the film face, has excellent magnetooptical characteristics including increased coercive force and large Kerr-rotation angle and Faraday-rotation angles, and is excellent in resistance to oxidation and in consequence the coercive force and Kerr-rotation angle of the film do not substantially change with time. The film has a high reflectance as well. Further, the amorphous alloy thin film according to the invention may be formed on a substrate at room temperature, and the film so formed need not be heat treated.

The invention will be further illustrated by the following.

EXPERIMENT RUNS 1-21

Using a composite target with chips of Pt and another element arranged in predetermined proportions on Co target, there was deposited on a glass substrate at 20°-30° C. by DC magnetron sputtering an amorphous alloy thin film having the composition as denoted in Table 1. The conditions under which the film was formed included Ar pressure of 5m Torr., Ar flow rate of 3 sccm and ultimate degree of vacuum of not more than $5 \times 10^{-6}$ Torr, and a DC current value (A) and a sputter time (sec) were shown in Table 1.

The crystalline condition of the films obtained was determined by broad angle X-ray diffractometry. The composition of the films obtained was determined by ICP emission spectroscopic analysis.

The Kerr-rotation angle was measured by the inclination incidence method ($\lambda = 633$nm) at a remanent magnetization on the external magnetic field of zero from the side of the glass substrate. A concrete method of measurement and apparatus therefor to be employed in the inclination incident method are described in "Measuring Techniques of Magnetic Materials", compiled by Kazuo Yamakawa (published by Torikepps K. K. on Dec. 15, 1985), pp. 261-263.

The reflection of the films obtained was determined with $\lambda = 780$nm, using an Al film formed on a glass substrate by vacuum evaporation as a standard sample.

Further, the alloy films obtained were tested for the resistance to oxidation in the manner as noted below. The film as formed on the glass substrate was subjected to an environment test in which the films is allowed to stand under a hot humid condition of 85° C., and 85% RH for a period of 240, 450 or 1000 hours. At the end of the period, the Kerr-rotation angle ($\theta$k), reflectance (R) and coercive force (Hc) were determined and compared with the initial values prior to the environment test, $\theta k_0, R_0$ and $Hc_0$, respectively. The results are shown in Table 1.

EXPERIMENT RUNS 22 and 23

A thin film of an alloy of Pt-Co or Tb-Co was prepared and tested following the procedure of the preceding Experiment Runs expect that a composite target with a chip of Pt or Tb arranged on a Co target was used. The results are shown in Table 1.

Table 1

| Exp. Run | Conditions of film forming | | Film composition atom % | Crystalline condition | θ ko deg | Ro % | R·θ ko | Hco KOe | Square form ratio |
|---|---|---|---|---|---|---|---|---|---|
| | Current(A) | Time(sec.) | | | | | | | |
| 1 | 0.20 | 90 | $Pt_{76}Ti_2Co_{22}$ | Amorphous | 0.15 | 73 | 0.11 | 0.8 | |
| 2 | 0.20 | 180 | $Pt_{79}Ti_4Co_{17}$ | Amorphous | 0.08 | 72 | 0.06 | 0.6 | 0.27 |
| 3 | 0.20 | 90 | $Pt_{46}Ni_1Co_{53}$ | Amorphous | 0.15 | 73 | 0.11 | 0.9 | |
| 4 | 0.20 | 90 | $Pt_{76}Cu_1Co_{23}$ | Amorphous | 0.16 | 73 | 0.12 | 0.9 | |
| 5 | 0.20 | 180 | $Pt_{78}Cu_5Co_{17}$ | Amorphous | 0.11 | | | 0.6 | 0.14 |
| 6 | 0.20 | 180 | $Pt_{72}Zn_8Co_{10}$ | Amorphous | 0.06 | | | 0.5 | 0.12 |
| 7 | 0.20 | 180 | $Pt_{68}Nb_{11}Co_{21}$ | Amorphous | 0.18 | 71 | 0.13 | 0.7 | |
| 8 | 0.20 | 90 | $Pt_{74}Ta_1Co_{25}$ | Amorphous | 0.15 | 68 | 0.10 | 0.5 | |
| 9 | 0.20 | 90 | $Pt_{75}B_3Co_{22}$ | Amorphous | 0.17 | 71 | 0.12 | 0.8 | |
| 10 | 0.20 | 90 | $Pt_{74}In_1Co_{25}$ | Amorphous | 0.20 | 70 | 0.14 | 0.8 | |
| 11 | 0.20 | 90 | $Pt_{54}Si_{10}Co_{36}$ | Amorphous | 0.37 | 70 | 0.26 | 1.0 | |
| 12 | 0.20 | 90 | $Pt_{74}Sn_1Co_{25}$ | Amorphous | 0.28 | 71 | 0.20 | 1.0 | |
| 13 | 0.20 | 90 | $Pt_{73}Sn_1Co_{24}$ | Amorphous | 0.28 | 73 | 0.20 | 0.8 | |
| 14 | 0.20 | 90 | $Pt_{73}Pb_1Co_{26}$ | Amorphous | 0.37 | 74 | 0.27 | 0.9 | |
| 15 | 0.20 | 180 | $Pt_{70}Pb_5Co_{25}$ | Amorphous | 0.14 | | | 0.6 | 0.14 |
| 16 | 0.20 | 90 | $Pt_{75}Sb_1Co_{24}$ | Amorphous | 0.30 | 73 | 0.22 | 0.9 | |
| 17 | 0.20 | 180 | $Pt_{77}Sb_{12}Co_{11}$ | Amorphous | 0.08 | | | 0.6 | 0.41 |
| 18 | 0.20 | 180 | $Tb_{81}Te_9Co_{10}$ | Amorphous | 0.07 | | | 0.6 | 0.30 |
| 19 | 0.20 | 180 | $Pt_{52}Nd_{13}Co_{35}$ | Amorphous | 0.07 | | | 0.6 | 0.24 |
| 20 | 0.20 | 180 | $Pt_{49}Sm_{23}Co_{28}$ | Amorphous | 0.05 | | | 0.6 | 0.41 |
| 21 | 0.20 | 180 | $Pt\ Nd\ Co$ | Amorphous | 0.20 | 54 | 0.11 | 0.1 | |
| 22 | 0.20 | 180 | $Pt_{75}Co_{25}$ | Crystalline | Unmeasurable | 71 | | Unmeasurable | |
| 23 | 0.20 | 90 | $Tb_{23}Co_{77}$ | Amorphous | 0.19 | 56 | 0.11 | 6.9 | |

EXPERIMENT RUN 24

Using a composite target with chips of Pd, Nd and Co arranged on a Co target, a thin film of an alloy of Pd-Nd-Co series was formed on a glass substrate by a DC magnetron sputtering method. The conditions under which the film was formed included Ar pressure of 5m Torr., Ar flow rate of 3 sccm, ultimate degree of vacuum of not more than $5 \times 10^{-6}$ Torr., DC current of 0.20 A, and sputter time of 90 seconds. It was revealed by a broad angle X-ray diffractometry that the film obtained was amorphous, and it was also revealed by a fact that a Kerr-rotation angle was observed that the film was vertically magnetizable.

EXPERIMENT RUN 25

Using a composite target with chips of Sb and Pd arranged on a Co target, a thin film of an alloy of Pd-Sb-Co series was formed on a glass substrate by a DC magnetron sputtering method. The conditions under which the film was formed included Ar pressure of 5m Torr., Ar flow rate of 3 sccm, ultimate degree of vacuum of not more than $5 \times 10^{-6}$ Torr., DC current of 0.20 A, and sputter time of 90 seconds. It was revealed by a broad angle X-ray diffractometry that the film obtained was amorphous, and it was also revealed by a fact that a A Kerr-rotation angle was observed that the film was vertically magnetizable.

What is claimed is:

1. A thin film of an amorphous alloy consisting essentially of
   (i) 2 to 95 atom % of at least one element selected from Fe and Co,
   (ii) at least 15 atom % to 94 atom % of at least one element selected form Pt and Pd, and
   (iii) 2 to 95 atom % of at least one element selected from
   (a) 3d transition elements other than Fe and Co,
   (b) 4d transition elements other than Pd,
   (c) 5d transition elements other than Pt,
   (d) La, Ce, Pr, Nd, Pm, Sm, Eu or mixtures thereof,
   (e) Group III B elements,
   (f) Group IV B elements,
   (g) Group V B elements, and
   (h) Group VI B elements,
   and said film having an easy axis of magnetization perpendicular to its face.

2. The thin film of amorphous alloy in accordance with claim 1 wherein when a transition elements other than Fe and Co is present, it is selected from the group consisting of Ti, Ni, Cu or Zn.

3. The thin film of an amorphous alloy in accordance with claim 1 wherein when a 4d transition elements other than Pd are Zr or Nb.

4. The thin film of an amorphous alloy in accordance with claim 1 wherein when a 5d transition elements other than Pt is present, said element is Ta.

5. The thin film of an amorphous alloy in accordance with claim 1 wherein when an element selected from La, Ce, Pr, Nd, Pm, Sm and Eu is present, it is selected from the group consisting of Nd, Sm or Pr.

6. The thin film of an amorphous alloy in accordance with claim 1 wherein when a Group III B element is present, it is selected from the group consisting of B, Al or Ga.

7. The thin film of an amorphous alloy in accordance with claim 1 wherein when a Group IV B element is present, it is selected from the group consisting of Si, Sn, or Pb.

8. The thin film of an amorphous alloy in accordance with claim 1 wherein when a Group V B element is present, said element is Sb.

9. The thin film of an amorphous alloy in accordance with claim 1 wherein when a Group VI B element is present, said element is Te.

10. The thin film of an amorphous alloy in accordance with any one of the preceding claims 1 to 9 wherein said film has a thickness of from 20 to 50000 Å.

11. The thin film of an amorphous alloy in accordance with claim 1 wherein (iii) is at least one element selected from 3d transition elements other than Fe and Co.

12. The thin film of an amorphous alloy in accordance with claim 1 wherein (iii) is at least one element selected from 4d transition elements other than Pd.

13. The thin film of an amorphous alloy in accordance with claim 1 wherein (iii) is at least one element selected from 5d transition elements other than Pt.

14. The thin film of an amorphous alloy in accordance with claim 1 wherein (iii) is at least one element selected from La, Ce, Pr, Nd, Pm, Sm and Eu.

15. The thin film of an amorphous alloy in accordance with claim 1 wherein (iii) is at least one element selected from Group III B elements.

16. The thin film of an amorphous alloy in accordance with claim 1 wherein (iii) is at least one element selected form Group IV B elements.

17. The thin film of an amorphous alloy in accordance with claim 1 wherein (iii) is at least one element selected from Group V B elements.

18. The thin film of an amorphous alloy in accordance with claim 1 wherein (iii) is at least one element selected from Group VI B elements.

19. The thin film of an amorphous alloy in accordance with claim 1 wherein when at least 50 atom % of (iii) is selected from La, Ce, Pr, Nd, Pm, Sm, Eu and mixtures thereof, (i) is present in said film in an amount of 5 to 84 atom %; and when at least 50 atom % of (iii) is other than an element selected from La, Ce, Pr, Nd, Pm, Sm, Eu and mixtures thereof, (i) is present in said film in an amount of 5 to 94 atom %.

20. The thin film of an amorphous alloy in accordance with claim 1 wherein when at least 50 atom % of (iii) is selected form La, Ce, Pr, Nd, Pm, Sm, Eu and mixtures thereof, (ii) is present in said film in an amount of 15 to 94 atom %; and when at least 50 atom % of (iii) is other than an element selected from La, Ce, Pr, Nd, Pm, Sm, Eu and mixtures thereof, (ii) is present in said film in an amount of 15 to 90 atom %.

21. The thin film of an amorphous alloy in accordance with claim 1 wherein when at least 50 atom % of (iii) is selected from La, Ce, Pr, Nd, Pm, Sm, Eu and mixtures thereof, (iii) is present in said film in an amount of 10 to 80 atom %; and when at least 50 atom % of (iii) is other than an element selected from La, Ce, Pr, Nd, Pm, Sm, Eu and mixtures thereof, (iii) is present in said film in an amount of 5 to 94 atom %.

* * * * *